United States Patent [19]

Walton et al.

[11] Patent Number: 4,806,300
[45] Date of Patent: Feb. 21, 1989

[54] METHOD FOR SOFTENING A NONWOVEN WEB

[75] Inventors: Richard R. Walton, 10 W. Hill Pl., Boston, Mass. 02114; George E. Munchbach, Norfolk County, Mass.

[73] Assignee: Richard R. Walton, Boston, Mass.

[21] Appl. No.: 56,296

[22] Filed: May 29, 1987

Related U.S. Application Data

[63] Continuation of Ser. No. 806,590, Dec. 9, 1985, abandoned.

[51] Int. Cl.$^4$ .................. B29C 55/16; B29C 55/18
[52] U.S. Cl. .................. 264/288.8; 264/282; 264/DIG. 47; 428/198
[58] Field of Search ............ 264/280, 282, 286, 288.4, 264/288.8, 290.2, DIG. 47, 68; 428/198, 910

[56] References Cited

U.S. PATENT DOCUMENTS

| | | | |
|---|---|---|---|
| 2,007,047 | 7/1935 | Gibbs . | |
| 2,874,618 | 2/1959 | Yang | 264/282 |
| 3,161,557 | 12/1964 | Muller | 264/286 |
| 3,220,057 | 11/1965 | Walton | 264/282 |
| 3,233,029 | 2/1966 | Rasmussen | 264/288.8 |
| 3,300,368 | 1/1967 | Cooper et al. | 264/282 |
| 3,421,189 | 1/1969 | Schiffer . | |
| 3,501,565 | 3/1970 | Kalwaites et al. | 264/282 |
| 3,527,668 | 9/1970 | Kusters et al. | 264/286 |
| 3,624,874 | 12/1971 | Lanchenauer . | |
| 3,849,526 | 11/1974 | Muller et al. | 264/286 |
| 4,151,245 | 4/1979 | Suzuki | 264/280 |
| 4,153,664 | 5/1979 | Sabee | 264/280 |
| 4,223,059 | 9/1980 | Schwarz | 428/198 |
| 4,517,714 | 5/1985 | Sneed et al. | 264/DIG. 47 |

Primary Examiner—James Lowe

[57] ABSTRACT

A thermoplastic nonwoven web is softened by stretching the web in the cross-machine direction, stretching the web in the machine direction, and shearing the surfaces of the web relative to each other. The resulting web has increased flexibility and increased surface nap which correlates with increased perceived softness.

5 Claims, 3 Drawing Sheets

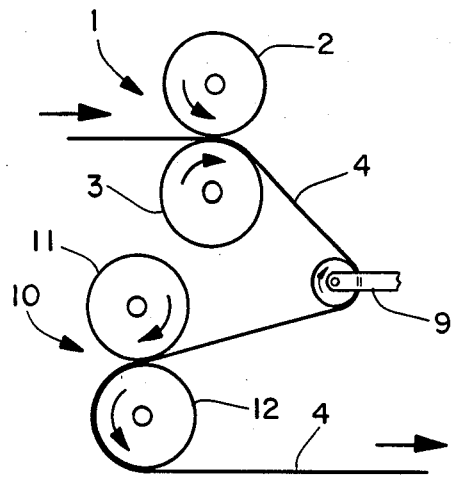
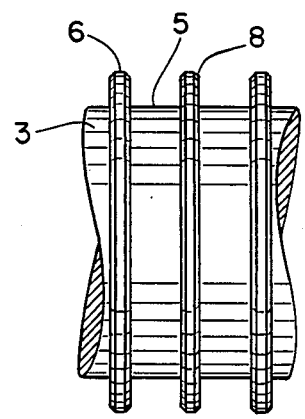
FIG. 1  FIG. 2
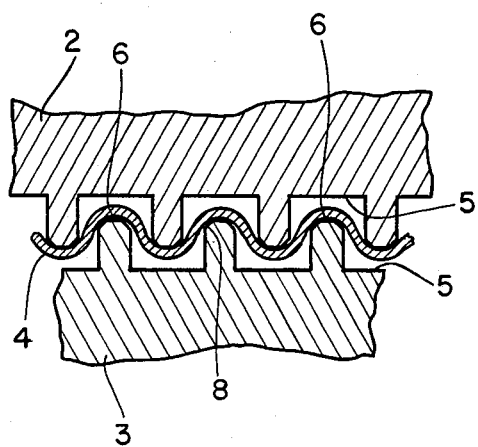
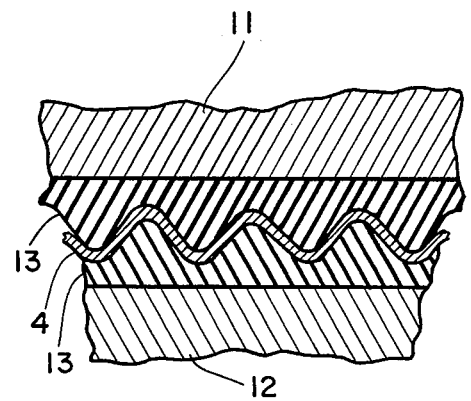
FIG. 3  FIG. 4

METHOD FOR SOFTENING A NONWOVEN WEB

This is a continuation of application U.S. Ser. No. 806,590, filed Dec. 9, 1985, now abandoned.

BACKGROUND OF THE INVENTION

Nonwoven materials possess properties that make them useful in many roles previously played by cloth. However, nonwoven materials could better serve a wider range of applications if it were possible to soften the nonwoven material without weakening the material to an unacceptable degree. The integrity of nonwoven materials is ordinarily achieved by bonds established between the discrete fibers of the material. Generally these bonds are not substantially free to slide or yield to pressures. The result is that nonwoven materials often exhibit a stiffness and lack of flexibility that is distinctly different from the drape exhibited by woven materials wherein the fibers are mechanically woven together and are therefore free to slide along each other at a substantial number of their contact points. In addition, nonwovens often lack sufficient nap to improve perceived softness.

Therefore there is a need to improve the drape and perceived softness of nonwovens for certain uses, particularly for uses where the nonwoven material contacts the skin, such as use in diaper liners.

SUMMARY OF THE INVENTION

In one aspect, the invention resides in a method of softening a nonwoven thermoplastic web, such as a diaper liner, comprising stretching the web in the cross-machine direction, stretching the web in the machine direction, and shearing the two surfaces of the web relative to each other, wherein the resulting web has increased flexibility and a nap while retaining sufficient tensile strength.

In a further aspect, the invention resides in a spun-bonded thermoplastic diaper liner having increased flexibility and nap.

These and other aspects of the invention will be described in greater detail in reference to the Drawing.

BRIEF DESCRIPTION OF THE DRAWING

FIG. 1 is a schematic representation of one embodiment of the method of this invention, in which cross-machine direction stretching, machine direction stretching, and shearing are carried out in two distinct stages.

FIG. 2 is a plan view of a segment of one of the rolls in the first of the two stages shown in FIG. 1.

FIG. 3 is a machine direction view of the nip of the first stage of FIG. 1, illustrating the intermeshing of the rolls.

FIG. 4 is a machine direction view of the nip of the second stage of FIG. 1, illustrating the intermeshing of the rubber covered rolls.

DETAILED DESCRIPTION OF THE INVENTION

Figure 5:
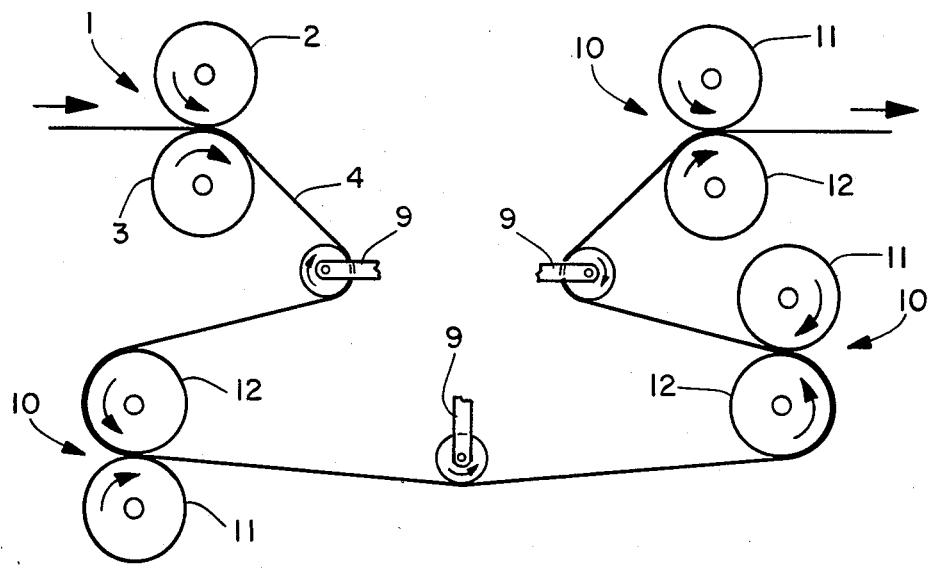
FIG. 5 is a schematic representation of another embodiment of the method of this invention wherein the second stage treatment is expanded to include two additional treatment nips.

Referring generally to FIGS. 1 through 5, one embodiment of the method of this invention has a first stage treatment and a second stage treatment. The second stage treatment may be multiple units, as illustrated in FIG. 5, to obtain different degrees of improved web flexibility and improved surface nap, yielding overall improvement in perceived softness. The first stage treatment comprises passing the web, while under tension in the machine direction, through the intermeshing region of two grooved rolls which are operated in a non-contacting mating fashion. By way of example, rolls have been designed such that there can be intermeshing of up to one-hundred thousandths of an inch between their two outside diameters without contact between a land and a groove at any point to avoid cutting of the web. Significant softening of a web is experienced when the intermeshing is approximately from about 0.010 inch to about 0.060 inch. The outer circumference lands of the rolls are roughened and sharp corners have been broken or rounded to further eliminate cutting action. The rolls may be heated or cooled to a temperature which can affect the plastic deformation of the web material being passed through the intermeshing region. The temperature of the roll introduces more flexibility for ultimately obtaining softness, but the effect depends upon the material and the speed of processing.

First stage treatment stretches the web material in the cross-machine direction and the machine direction causing plastic deformation and loosening of interfiber bonds. This results in the web having been stretched to an increased width. The roughness of the lands significantly influences the first treatment stage. If the surfaces are too rough and/or there are sharp edges, cutting or shredding of the web will occur. However, perfectly smooth surfaces allow the web to adjust to the contours with little or no tension and no effect is experienced. Therefore, an optimum range of roughness appears to be possible for the maximum diameter surface (lands) of the grooved rolls.

The web, having passed through the first treatment stage, is further treated as it passes through a second treatment stage. The second treatment stage further treats the web through cross-machine, machine, and Z-direction stretching. The second stage treatment is obtained by passing the web through the nip of two rolls rotating in opposite directions. Both rolls have a surface velocity vector in the same direction as the movement of the web, i.e. in the machine direction. A nip pressure is maintained to create intimate contact between the two rolls and the web between them. The surface of each roll is covered with a flexible material, such as rubber, which has circumferential ridges and valleys, yielding a cross-machine direction surface profile which is generally sinusoidal in nature. In operation, the surface profiles intermesh. However, the contours need not be perfectly mated, in which case resulting in a random pattern of contact points between the intermeshing ridges and valleys of the two rolls. This operation results in some stretching in the elastic range, some stretching in the plastic-deformation range, some loosening of interfiber bonds, and some stretching to failure of individual fibers in very short distances between the multitude of contact points on the two covered rolls.

The relative surface speed difference between a ridge and its mating valley creates a shear stress in the Z-direction which, when combined with the stretching, produces an additional softening and surface treating of the web. The result of the surface treating is in the form of a fuzzy, tactile quality or nap. For additional nap formation, the two rolls may be run at different rotational speeds. The web is partially wrapped around one of the rotating rolls and the surface softening and nap formation is obtained on the side adjacent to the other rotating roll, which is rotating at a speed greater than the speed of the roll around which the web is partially wrapped. The faster rotating roll rotates at a speed of about 105-140 percent of the slower moving roll. If the faster rotating roll rotates at a speed greater than 140% of the speed of the slower moving roll, shredding of the web material may result. At a speed differential of less than 5%, insufficient web softening occurs.

Different degrees of treatment can be obtained by changing the resilience of the roll covering material. The treatment can also be changed by using a different intermeshing pattern.

Referring now to FIGS. 1 and 5, FIG. 1 is a highly schematic, elevational view of one embodiment of the method of this invention. Nonwoven web 4 passes through first treatment stage 1 which has first roll 2 and second roll 3 forming a nip. Web 4 then passes across a web control unit 9 and therefrom through a second treatment stage 10 which has first resilient roll 11 and second resilient roll 12. Web control unit 9 serves to guide and control web 4 and may be any suitable web control unit. Many such units are well known in the art. As shown in FIG. 5, additional second treatment stages 10 may be incorporated into the process if needed.

Referring now to FIGS. 2 and 3, rolls 2 and 3 may be substantially identical. As shown in FIG. 2, roll 2 has grooves 5 and lands 6. Lands 6 have a roughed surface and have bevel 8 at their edges. For a 7½ inch roll diameter, the land width can be about 0.04 inch and the groove depth can be about 0.08 inch. The groove width can be about the same as the land width. In operation, rolls 2 and 3 intermesh but do not compressively grip nonwoven web 4. The roughened surface of land 6 serves to urge web 4 through the nip without the need for compressive engagement of web 4 by rolls 2 and 3. Rolls 2 and 3 may be heated or cooled in any suitable manner.

As shown in FIG. 3, lands 6 and grooves 5 intermesh and act upon web 4 to cause elastic and inelastic deformation, loosening of interfiber bonds, and, only to a small degree, the breakage of individual fibers. The design of the roll surfaces of rolls 2 and 3 of the first stage need not be the same as the design of the roll surfaces of rolls 11 and 12 of the second stage.

Referring now to FIGS. 1 and 4, second stage rolls 11 and 12 are covered with a resilient material 13, such as rubber, and have a sinusoidal cross-sectional surface profile formed from circumferential ridges and valleys at the surface of rolls 11 and 12. A suitable rubber coating is Style 1410 obtained from Green Rubber Co., Cambridge, Mass. and was applied to a pair of 4 inch diameter rolls. The sinusoidal ridges and valleys of rolls 11 and 12 are preferably but not necesarily mating. That is, the crests and troughs of the circumferential ridges and valleys of roll 11 are mated into the corresponding troughs and crests of the circumferential ridges and valleys of roll 12. The period of the sinusoidal cross-sectional profile of roll 11 is, for all practical purposes, the same in nature as the period of the sinusoidal cross-sectional profile of roll 12. As a result of this mated contact of the circumferential ridges and valleys of rolls 11 and 12, the nip where web 4 is being pressed between rolls 11 and 12 is non-constant and continually changing in the cross-machine direction. In addition, roll 11 is driven at a speed faster than that of roll 12 which presents to the opposite web surfaces different contacting conditions with the respective rolls.

The mechanisms of softening which occur in the second stage are complex and their degree changes with the materials being softened, roller settings, operating speeds, and the like. However, it is proposed that the mating, resilient, sinusoidal ridges and valleys are continuously stretching web 4 in small incremental widths between the roll contact points. This stretching being the result of the ridges and valleys forcing web 4 to depart from the flat nip profile typically seen in nipped rubber covered rolls configurations. With rolls 11 and 12 operating at differential speeds, a Z-direction momentary shear stressing of the nonwoven web occurs as it is compressively passed through the nip formed by rolls 11 and 12. This action, occurring essentially simultaneously with the cross-machine direction stretching of the web by the nip formed by rolls 11 and 12, further contributes to web softening. The net result is that web 4 is kneaded, stressed, and relieved in the nip between rolls 11 and 12.

Further, rotating roll 11 at a speed greater than that of roll 12, produces a situation where an abrading force is developed between web 4 and the surface of rolls 11 and 12, but this abrading force is developed over comparatively small areas for short durations of time. The surfaces of web 4 are thereby textured, but the mechanics of the texturing is such that the depth of the texturing is not great and the damage done to the strength properties of web 4 is not great. The texturing results in fibrils and fibers being partially broken loose from web 4 and a significant increase in the nap and bulk dimension of web 4.

The method of this invention is characterized by the ability to adjust and regulate a number of controllable parameters to permit the method to produce a controlled and balanced degree of softening and texturing for a significant range of properties of nonwovens. For instance, the results obtained may be markedly changed by heating rolls 2 and 3 of treatment stage 1, or by changing the degree of intermesh of rolls 2 and 3, or by changing the degree of pressure in the nip formed by rolls 11 and 12, or by changing the speed relationship between rolls 11 and 12, or by changing the design of the lands and grooves on rolls 2 and 3, or by changing the design of the ridges and valleys of rolls 11 and 12, or by combinations of the above adjustments. The results produced are a dramatic metamorphosis from the original nonwoven web to the softened nonwoven web which generally preserves the desirable properties of the original nonwoven web while imparting to the nonwoven web properties normally associated with woven cloth.

In another embodiment, which is preferred, the method of this invention can be carried out in a single treatment stage using a combination of the characteristics of the first and second treatment stages described above. More particularly, by providing rolls 2 and 3 as described in FIGS. 1-3 with a sufficiently frictionally web-engaging surface and rotating roll 2 at a faster speed than roll 3, a nonwoven thermoplastic web can be softened by simultaneously stretching the web in the cross-machine direction, stretching the web in the machine direction, and shearing the two surfaces of the web relative to each other as previously described. This method has the advantage of avoiding wear problems associated with resilient material-covered rolls 11 and 12 as used in the second stage 10 of the two stage embodiment.

Figure 6:
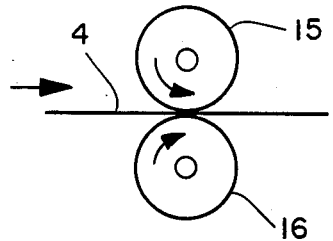
FIG. 6 is a schematic representation of a preferred embodiment of the method of this invention, in which cross-machine direction stretching, machine direction stretching and shearing of the web are performed in one stage.

This simplified single-stage method is depicted in FIG. 6, wherein the nonwoven web 4 is passed through the nip formed by rolls 15 and 16, which are only partially engaged as shown and described in FIG. 3. The surfaces of the rolls are of a nature which are sufficiently rough to frictionally engage the web, yet the nature of the surface is not such as to cause excessive cutting of the fibers of the web. (A suitable surface is the 300 RMS tungsten carbide plasma-blown coating from General Plasma Assoc Inc., 5 Draper St., Woburn, Mass. 01801). The rolls 15 and 16 are operated at different rotational speeds, which preferably differ by about 5% to about 40%, although a speed differential of about 12-14 percent has been found to be preferred for diaper liner softening. As with the two stage treatment, the method of this embodiment can be controlled to achieve a balanced degree of softening and texturing. In particular, the results can be changed by heating rolls 15 and 16, by changing the degree of intermesh of rolls 15 and 16, by changing the degree of pressure in the nip formed by rolls 15 and 16, by changing the speed relationship between rolls 15 and 16, by changing the design of the lands and grooves on rolls 15 and 16, or by combinations of the above adjustments. Hence optimization for a given system is required.

As necessary, the treatment can be repeated at least once to incrementally improve web softness to the desired level.

Figure 7A:
FIGS. 7A, 7B, and 7C are tracings of "cross-sectional" 10× magnification photographs of a typical untreated spunbonded diaper liner (7A), a commercially available, competitive diaper liner (7B), and a diaper liner treated in accordance with this invention (7C), illustrating the increased nap created by the method of this invention.
Figure 7B:
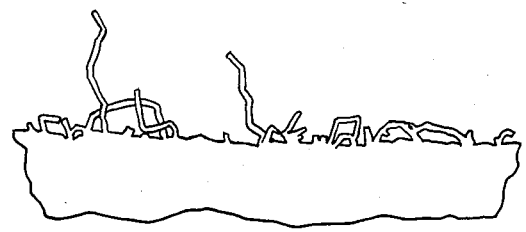
Figure 7C:
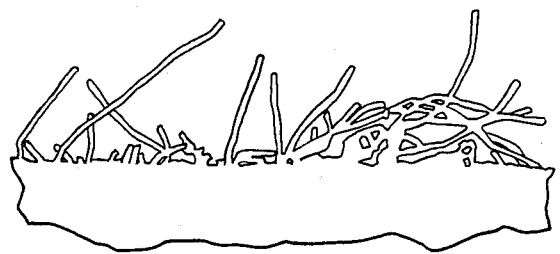

FIGS. 7A, 7B, 7C are tracings of magnified (10×) photographs of three different samples of diaper liner material. The tracings represent a side view of the surface of the material as it is folded over a straight edge, showing the degree of fuzziness or nap exhibited by the surface of the material.

The procedure for photographing and measuring the degree of fuzziness is as follows. A ruler is attached to the "Y"-motion portion of a 4"×4" autostage on a Leitz Ortholux II microscope that is the optical input for a scanner attached to a Cambridge 900 Image Analysis System. A Zeiss 1X objective was used for viewing the sample. A diaper liner material sample was cut into 4"×20" pieces and "fluffed up" with an air blast from a micropipette attached to a conventional laboratory air line. The sample is taped down to the "X"-motion part of the stage, brought under the ruler, and draped back over the ruler to hang over a draping bar. A 30 to 50 gram weight is taped to the sample. The surfaces of the liner are fluffed up again with the air blast to ensure reproducibility, and a 35-field scan is taken with only fuzz protruding from the bent edge detected (gray levels 20 to 50 with 2-D Autodelinerator ON). Seven X-field edges and five Y-field edges are indexed. In each field, the total field perimeter from detected fuzz is measured, and divided by the field height (Live frame height), which was 8.56 mm. The resulting image analysis yields a numerical profile perimeter index (PPI) representing the degree of fuzziness (nap) of each sample. For the untreated sample shown in FIG. 7A, the PPI was about 0.65 mm./mm. For the commercially available, competitive sample shown in FIG. 7B, the PPI was about 2.8 mm./mm. For the sample of the product of the method of this invention shown in FIG. 7C, the PPI was about 7.4 mm./mm. The significant increase in PPI correlates to an increase in perceived softness.

In order to further illustrate the softening effect of the method of this invention, polypropylene spunbonded webs of the type commonly used for diaper liners were treated in accordance with three of the embodiments described above, namely a two stage treatment, a one stage treatment, and a one stage treatment with a double pass. Softness was measured using a Smiltneek Softness Test (SST), which measures the drapiness of a web by dropping a weighted rod with a hemispherical foot onto a 6 inch diameter circular test sample supported by a cylinder into which the rod penetrates. The extent of penetration of the rod into the cylinder is a measure of the flexibility or drapiness of the sample. Higher SST values (greater degree of penetration) correspond to greater softness. The results, which are tabulated in the Table below, further illustrate the softness improvements attainable through the use of the method of this invention.

TABLE
(Web Softening)

|  | Control | Two Stage | One Stage | One Stage (2 passes) |
|---|---|---|---|---|
| Line Speed (fpm) |  | 300 | 300 | 300 |
| Intermesh (inches) |  | 0.046 | 0.035 | 0.038 |
| First Stage Roller Speed Differential |  | 0% | 13% | 10% |
| Second Stage Roller Speed Differential |  | 20% | — | — |
| Basis Weight (oz/yd$^2$) | 0.67 | 0.67 | 0.67 | 0.67 |
| Softness (SST) | 173 | 353 | 380 | 513 |
| Approximate Cross-Machine Direction Tensile Strength (lbs./3 inch grab) | 13 | 12 | 8 | 7 |

It will be appreciated that the foregoing examples, shown only for purposes of illustration, are not to be construed as limiting the scope of this invention, which is defined by the following claims.

We claim:

1. A method of softening a nonwoven thermoplastic web wherein the web is passed through two nips, the first nip being formed between two rolls having noncontacting intermeshing circumferential lands and grooves and which are rotating at about the same speed and the second nip being formed between two rolls having resilient surfaces with circumferential ridges and valleys and rotating at different speeds relative to each other.

2. A method of softening a nonwoven thermoplastic web wherein the web is passed through at least one nip formed between two rolls having noncontacting intermeshing circumferential lands and grooves and rotating at different speeds relative to each other, the surfaces of the lands being of a nature to frictionally engage the web.

3. The method of claim 2 wherein the surfaces of the lands contain a tungsten carbide plasma-blown coating.

4. The method of claims 1 or 2 wherein the roll speed differential is from about 5 to about 40 percent.

5. The method of claim 1 or 2 wherein the intermeshing of the lands and grooves is from about 0.010 to about 0.060 inch.

* * * * *